United States Patent
Fink et al.

(10) Patent No.: US 8,536,834 B2
(45) Date of Patent: Sep. 17, 2013

(54) MOBILE ENVIRONMENT-CONTROLLED UNIT AND METHOD OF OPERATING A MOBILE ENVIRONMENT-CONTROLLED UNIT

(75) Inventors: Ulrich Fink, Maple Grove, MN (US); Alan D. Gustafson, Eden Prairie, MN (US); Stanley Hoium, West St. Paul, MN (US); Luis Camacho, Farmington, MN (US)

(73) Assignee: Thermo King Corporation, Minneapolis, MN (US)

( * ) Notice: Subject to any disclaimer, the term of this patent is extended or adjusted under 35 U.S.C. 154(b) by 452 days.

(21) Appl. No.: 12/977,956

(22) Filed: Dec. 23, 2010

(65) Prior Publication Data

US 2012/0159971 A1  Jun. 28, 2012

(51) Int. Cl.
*H02J 7/00* (2006.01)
*H02J 7/04* (2006.01)

(52) U.S. Cl.
USPC ........... 320/132; 320/128; 320/134; 320/136; 320/152

(58) Field of Classification Search
CPC ..................................................... Y02E 60/12
USPC ..................................................... 320/132
See application file for complete search history.

(56) References Cited

U.S. PATENT DOCUMENTS

| | | |
|---|---|---|
| 3,997,888 A | 12/1976 | Kremer |
| 5,222,469 A | 6/1993 | Sutton |
| 5,317,998 A | 6/1994 | Hanson et al. |
| 5,557,941 A | 9/1996 | Hanson et al. |
| 5,774,733 A | 6/1998 | Nolan et al. |
| 6,688,125 B2 | 2/2004 | Okamoto et al. |
| 6,828,914 B2 | 12/2004 | Zur et al. |
| 7,173,397 B2 | 2/2007 | Kinoshita et al. |
| 7,301,304 B2 | 11/2007 | Weisgerber et al. |
| 7,475,234 B2 | 1/2009 | Suzuki |
| 2006/0243257 A1 | 11/2006 | Freund et al. |
| 2007/0000703 A1* | 1/2007 | Hughes et al. ............... 180/65.4 |

(Continued)

FOREIGN PATENT DOCUMENTS

| | | |
|---|---|---|
| EP | 2128545 A1 | 12/2009 |
| JP | 3001458 | 1/1991 |

(Continued)

OTHER PUBLICATIONS

Thermo King, SR-2 SmartReefer2 Microprocessor Control System, Diagnotic Manual, 1-431 (2005).

(Continued)

*Primary Examiner* — Edward Tso
*Assistant Examiner* — Ahmed Omar
(74) *Attorney, Agent, or Firm* — Michael Best & Friedrich LLP

(57) ABSTRACT

A mobile environment-controlled unit having a structure, a compartment supported by the structure, and an environmental-control system in environmental communication with the compartment. The environmental-control system is configured to control an environmental parameter of the compartment. The environmental-control system includes an internal combustion engine, having a starter, powering the environmental-control system; a battery powering the starter; and a controller. The controller monitors battery health status, predicts battery failure, and communicates the predicted battery failure. Also, described is a method of operating the mobile environment-controlled unit and a controller for controlling the mobile environment-controlled unit.

20 Claims, 4 Drawing Sheets

(56) References Cited

U.S. PATENT DOCUMENTS

| | | |
|---|---|---|
| 2007/0029974 A1 | 2/2007 | Uchida |
| 2007/0166574 A1 | 7/2007 | Nakashima et al. |
| 2011/0029193 A1* | 2/2011 | Shaw et al. .................... 701/35 |

FOREIGN PATENT DOCUMENTS

| | | |
|---|---|---|
| JP | 6027175 | 2/1994 |
| JP | 2001050430 | 2/2001 |
| KR | 100629106 B1 | 9/2006 |
| KR | 1020100070594 A | 6/2010 |

OTHER PUBLICATIONS

Thermo King, SR-2 SmartReefer2 Microprocessor Control System, Diagnostic Manual, Section 2—SR-2 Hardware Description, 2 pages (2005).

International Search Report and Written Opinion for corresponding International Application No. PCT/US11/64309 mailed on Jul. 25, 2012.

* cited by examiner

MOBILE ENVIRONMENT-CONTROLLED UNIT AND METHOD OF OPERATING A MOBILE ENVIRONMENT-CONTROLLED UNIT

BACKGROUND

The invention relates to a mobile environment-controlled unit, such as an over-the-road compartment trailer, having an environmental-control system, such as a refrigeration unit, powered by an engine, which is started by battery power.

Transport refrigeration systems having an engine for powering the refrigeration unit can be operated in at least two modes of operation: continuous mode or cycle sentry mode. Continuous mode provides the benefit of a constant air flow through the compartment; however consumes more fuel than cycle sentry mode. Cycle sentry mode typically runs the refrigeration unit when the temperature of the compartment is not within a specified range or when critical system conditions exits that limits or prevents a restart of the engine. Critical system conditions that may force the engine to start or force the engine to stay on can be a low battery voltage or a low engine temperature. An example of a mobile environment-controlled unit having continuous and cycle sentry operation modes is a compartment trailer having a THERMO KING® transport temperature control unit with CYCLE-SENTRY™ protection.

SUMMARY

To operate a mobile environment-controlled unit in cycle sentry mode typically requires a reliable automatic engine start procedure, which is dependent on the battery. The invention monitors battery health status and predicts battery failure. The prediction of battery failure reduces potential load loss or service calls for units that are out in the field. Further, the invention can address the challenge of determining battery health status using data and information that are already available with some environmental-control units.

In one embodiment, the invention provides a mobile environment-controlled unit having a structure, a compartment supported by the structure, and an environmental-control system in environmental communication with the compartment. The environmental-control system is configured to control an environmental parameter of the compartment. The environmental-control system includes an internal combustion engine, having a starter, powering the environmental-control system; a battery powering the starter; and a controller. The environmental-control system can also include an alternator for charging the battery after a successful engine start.

In one operation, the controller monitors an electrical parameter of the battery, monitors a non-battery parameter of the mobile environment-controlled unit, and controls the engine in a cycle mode. The cycle mode includes starting the engine based on the monitoring of the electrical parameter of the battery, stopping the engine based on the monitoring of the electrical parameter of the battery, starting the engine based on the monitoring of the non-battery parameter, and stopping the engine based on the monitoring of the non battery parameter. The operation of the controller can further include monitoring a battery health status, including counting a number of successive times the engine starts based on the monitoring of the electrical parameter of the battery without starting the engine based on the monitoring of the non-battery parameter. The counting can be based further on monitoring a timer between either the stopping of the engine based on the monitoring of the electrical parameter of the battery or the stopping the engine based on the monitoring of the non battery parameter and the starting the engine based on the monitoring of the electrical parameter of the battery.

In another embodiment, the invention provides a method of operating a mobile environment-controlled unit comprising a structure, a compartment supported by the structure, and an environmental-control system in environmental communication with the compartment. The environmental-control system includes an internal combustion engine, having a starter, and a battery powering the starter. The environmental-control system can also include an alternator for charging the battery after a successful engine start. The method includes (a) monitoring an electrical parameter of the battery; (b) monitoring a non-battery parameter of the mobile environment-controlled unit; (c) starting the engine based on the monitoring the electrical parameter of the battery; (d) stopping the engine based on the monitoring the electrical parameter of the battery; (e) starting the engine based on the monitoring the non-battery parameter of the mobile environment-controlled unit; (f) stopping the engine based on the monitoring the non-battery parameter of the mobile environment-controlled unit; (g) repeatedly performing steps (c), (d), (e), and (f); (h) performing a repetitive timing function between the completion of either step (d) or step (f) and the starting of step (c); (h) incrementing a count based on a number of successive times the method repeats step (c) without sequentially performing step (e), the incrementing being further based on the repetitive timing function; and (i) predicting the battery failing based on the count.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In one implementation, a refrigeration unit monitors battery health status by logging a number of consecutive engine restarts due to low battery voltage and a duration the engine is off before battery is discharged to a critical voltage level. The unit includes a restart counter to count the restarts due to low battery voltage and a restart timer, which records the time between engine turning off and restart again due to low battery voltage. In one example, if the unit has three consecutive engine restarts due to low battery voltage within a restart time limit, an alarm triggers. The alarm predicts to the operator that the battery is at the end of its useful life and should be exchanged.

In a more specific implementation, the unit operation includes one or more of the following: 1) a restart counter for low battery engine starts, 2) a restart timer for time between engine restarts resulting from low battery voltage, 3) an "end of battery life" indication after a defined number (e.g., three) consecutive low battery restarts within the restart time limit, 4) a reset of the counter if any other engine restart event occurs, and 5) a reset counter if the engine has not restart for more than a duration (e.g., 10 minutes).

Figure 1:
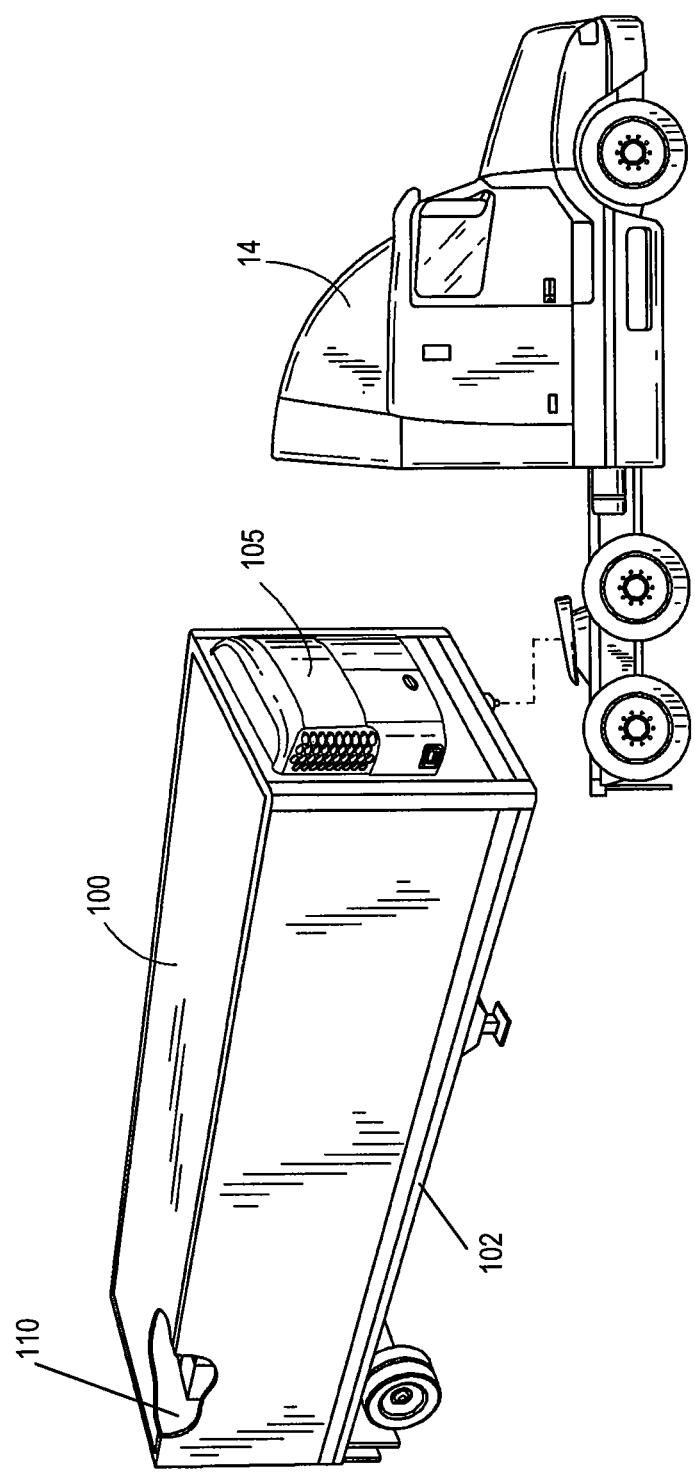
FIG. 1 is a perspective view of an over-the-road tractor and semi trailer.

The invention relates to a mobile environment-controlled unit having an environmental-control system and a compartment. Exemplary mobile environment-controlled units include an over-the-road trailer, over-the road truck body, bus, transport container, and railway car. The compartment can take the form of multiple compartments or have multiple zones. An exemplary environmental-control system includes a refrigeration system, heating system, humidity system, and air-quality system. In the specific example discussed below, the environment-controlled unit is an over-the-road refrigerated semi trailer 100 (FIG. 1) having a structure 102 supporting (or forming) a single compartment 110 cooled by a refrigeration unit 105. The structure 102 also supports the refrigeration unit 105.

Figure 2:
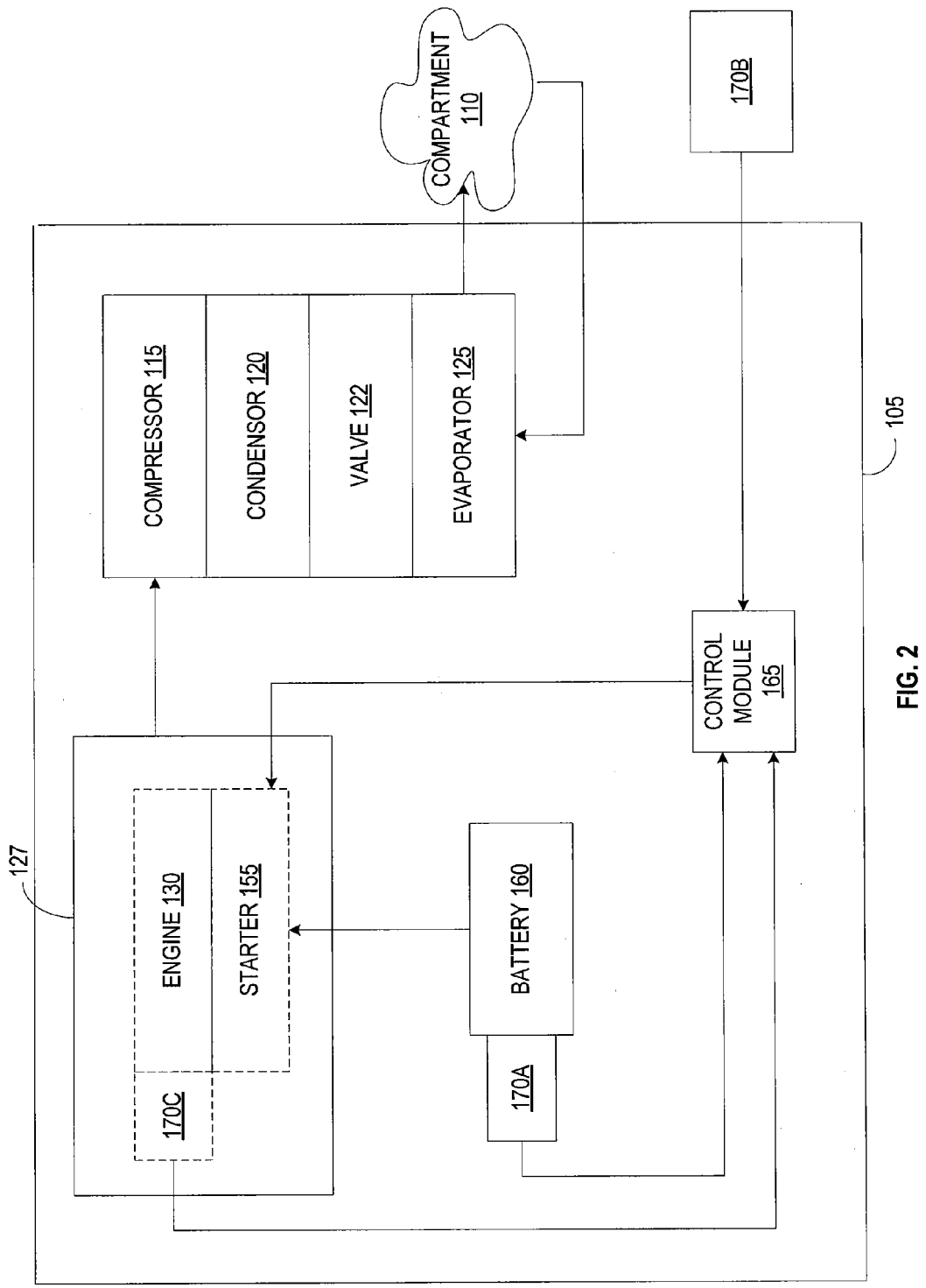
FIG. 2 is a block diagram of a refrigeration unit of the semi trailer of FIG. 1.

The refrigeration unit 105 includes conventional refrigeration elements, such as a compressor 115 (FIG. 2), condenser 120, expansion valve 122, and evaporator 125. The compressor 115 is powered, directly or indirectly, from an internal combustion engine 130. For example, the compressor 125 can be driven by an electronically-controlled motor, powered by any one of a belt-driven alternator, shore power, or other power source. In the construction shown in FIG. 2, the compressor includes a motor directly driven by a governed alternator 127 having an internal combustion engine 130.

For the describe construction, the refrigeration unit 105 is controlled in a "cycle" mode, which starts the engine 130 when a parameter is out of range and stops the engine 130 when the parameter is within range. The parameter may be, for example, battery voltage, compartment temperature, compartment humidity, compartment air quality, or engine temperature. In one specific example now discussed, the engine 130 starts after the battery voltage drops below a first voltage value and stops after the battery voltage rises above a second voltage value, which may be the same as the first voltage value. In another specific example now discussed, the engine 130 starts after the compartment temperature rises above a first temperature value and stops after the compartment temperature falls below a second temperature value, which may be the same as the first temperature value.

Referring again to FIG. 2, a starter 155 is powered by a battery 160 and is controlled in response to a signal from a control module 165. The control module 165 also receives a signal from a sensor 170. The signal has a value having a relation to the parameter. For example, the sensor 170A can be a voltage sensor and the signal has a relation to the voltage of the battery. As another example, the sensor 170B can be a temperature sensor and the signal has a relation to the temperature of the compartment 110. In another example, the sensor 170C may sense a first parameter, and the control of the engine starter 155 is based on a second parameter having a relation to the first parameter.

Before proceeding further, it should be understood that while the control module 165 is discussed herein as a module, and specifically a user-interface module, the control module can comprise multiple modules.

Figure 3:
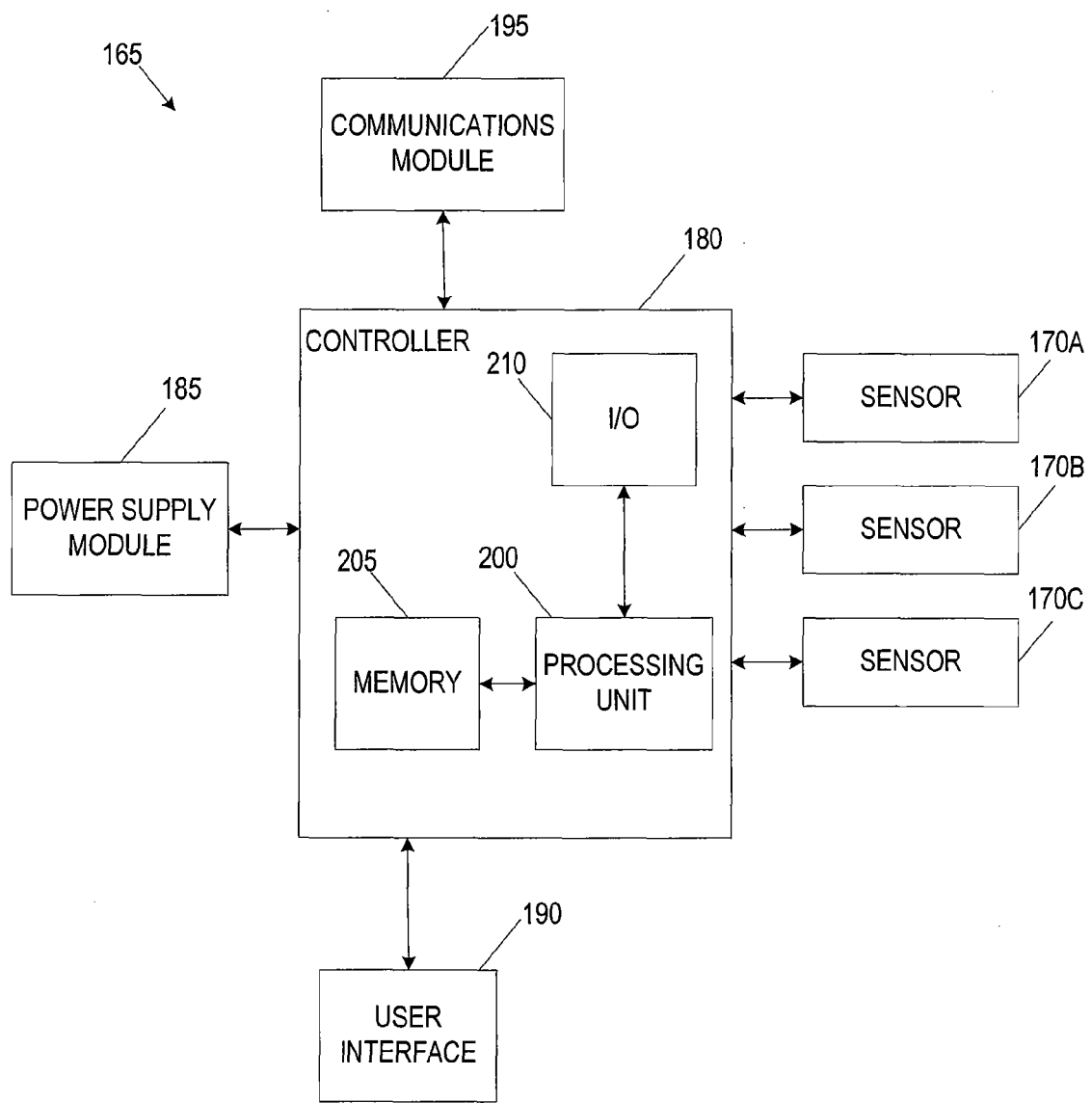
FIG. 3 is a block diagram of a control module of the refrigeration of FIG. 2.

The control module 165 includes, among other things, a controller 180 (FIG. 3), a power supply module 185, a user interface 190, and a communications module 195. The controller 180 includes combinations of software and hardware that are operable to, among other things, control the operation of the refrigeration unit 105. In one construction, the controller 180 includes a printed circuit board ("PCB") that is populated with a plurality of electrical and electronic components that provide power, operational control, and protection to the control module 165. In some constructions, the PCB includes, for example, a processing unit 200 (e.g., a microprocessor, a microcontroller, or another suitable programmable device), a memory 205, and a bus. The bus connects various components of the PCB including the memory 205 to the processing unit 200. The memory 205 includes, for example, a read-only memory ("ROM"), a random access memory ("RAM"), an electrically erasable programmable read-only memory ("EEPROM"), a flash memory, a hard disk, or another suitable magnetic, optical, physical, or electronic memory device. The processing unit 200 is connected to the memory 205 and executes software that is capable of being stored in the RAM (e.g., during execution), the ROM (e.g., on a generally permanent basis), or another non-transitory computer readable medium such as another memory or a disc. Additionally or alternatively, the memory 205 is included in the processing unit 200. The controller 180 also includes an input/output ("I/O") system 210 that includes routines for transferring information between components within the controller 180 and other components of the control module 165. For example, the communications module 195 is configured to provide communication between the control module 180 and one or more additional devices within the trailer 100 or tractor or external to the trailer 100 or tractor.

Software included in the implementation of the control module 165 is stored in the memory 205 of the controller 180. The software includes, for example, firmware, one or more applications, program data, one or more program modules, and other executable instructions. The controller 180 is configured to retrieve from memory and execute, among other things, instructions related to the control processes and methods described below. For example, the controller 180 is configured to execute instructions retrieved from the memory 205 for monitoring battery health status, predicting battery failure, and communicating the predicted battery failure. In other constructions, the controller 180 or external device includes additional, fewer, or different components.

The PCB also includes, among other things, a plurality of additional passive and active components such as resistors, capacitors, inductors, integrated circuits, and amplifiers. These components are arranged and connected to provide a plurality of electrical functions to the PCB including, among other things, filtering, signal conditioning, or voltage regulation. For descriptive purposes, the PCB and the electrical components populated on the PCB are collectively referred to as the controller 180.

The user interface 190 is included to control the control module 165 or the operation of the refrigeration unit 105 as a whole. The user interface 190 is operably coupled to the controller 180 to control, for example, setting the operation of the refrigeration unit 105 and communicating faults of the refrigeration unit 105. The user interface 190 can include any combination of digital and analog input/output devices required to achieve a desired level of interfacing with an operator. For example, the user interface 190 can include a computing device having a display and input devices, a touch-screen display, a plurality of knobs, dials, switches, buttons, faders, or the like.

Figure 4:
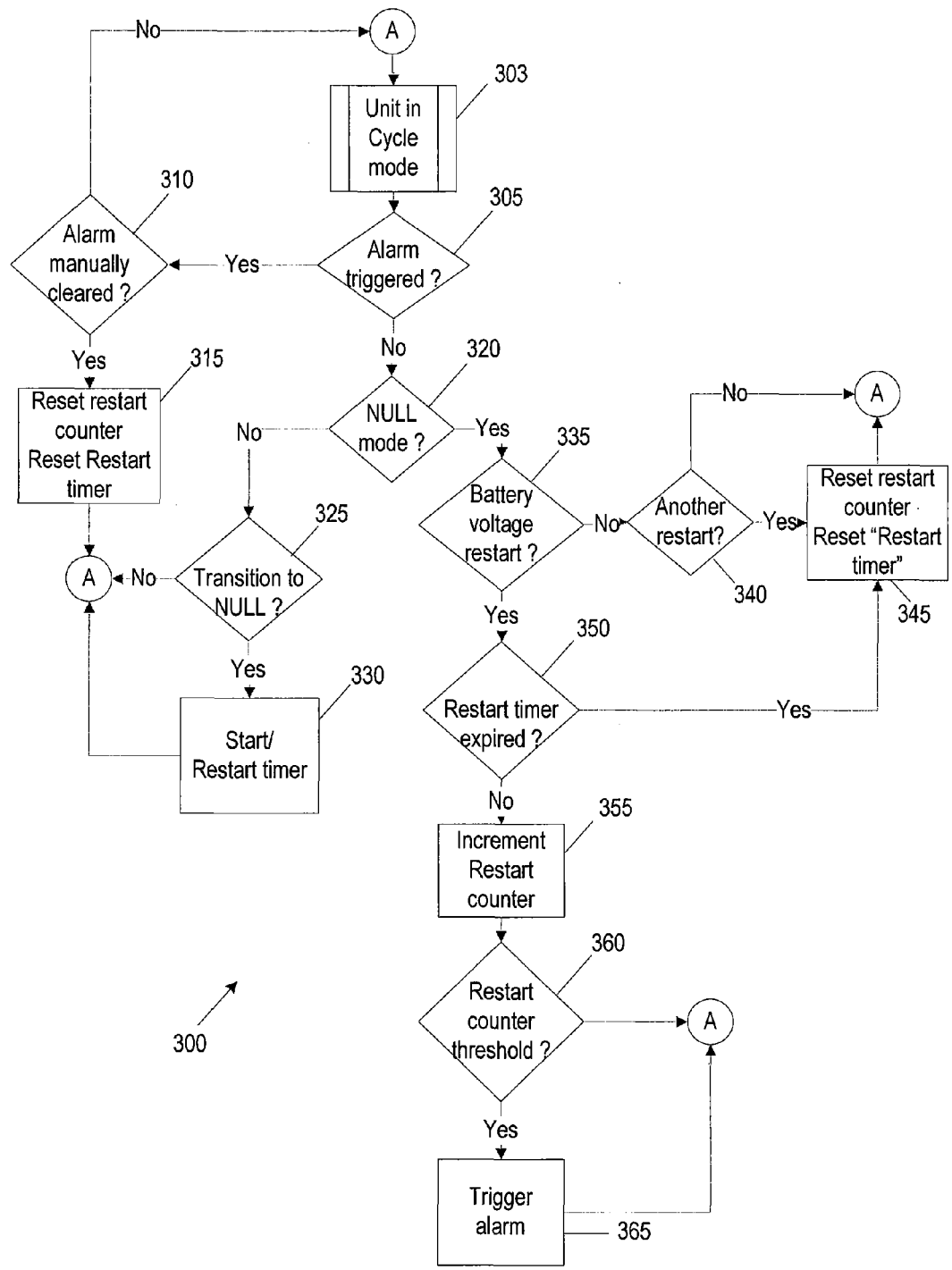
FIG. 4 is a flow diagram of a process for monitoring battery health status, predicting battery failure, and communicating the predicted battery failure.

FIG. 4 is a process 300 for monitoring battery health status, predicting battery failure, and communicating the predicted battery failure. The process 300 is performed when the refrigeration unit 105 is in cycle mode. Other operations of the cycle mode are represented by block 303. While in cycle mode, the control module 165 performs the steps in FIG. 4. The various steps described herein with respect to process 300 are capable of being executed simultaneously with other operations 303 of the cycle mode or other operations of the control module 165. Similarly, the various steps described herein with respect to process 300 are capable of being executed simultaneously, in parallel, or in an order that differs from the illustrated and iterative manner of execution shown in FIG. 3.

At step 305, the control module 165 determines whether an alarm had been triggered. The alarm can be a previous indication of a predicted battery failure. If an alarm was triggered, then the control module 165 determines whether the alarm is manually cleared by an operator (step 310). If the alarm is cleared, then the control module 165 clears (step 315) a counter referred to herein as the RESTART COUNTER and resets (step 315) a timer referred to herein as the RESTART TIMER. If the alarm is not manually cleared, then the control module 165, with respect to process 300, continuously repeats steps 305 and 310. If no alarm has been triggered (step 305), then the operation proceeds to step 320.

At step 320, the control module 165 determines whether the refrigeration unit is in a mode referred to herein as the NULL MODE. The NULL MODE refers to a mode where the control module 165 monitors the refrigeration unit, and more broadly the mobile environment-control unit, and stays in a ready state in anticipation of returning to an active control mode, such as a mode referred to herein as COOL MODE. If the control module 165 is not in NULL MODE (e.g., is in COOL MODE), then the control module 165 determines (step 325) whether a transition has occurred to the NULL MODE. For example, the refrigeration unit 105 can cease cooling, i.e., can cease being in COOL MODE, and proceed to the ready state, i.e., enter NULL MODE. When the process transitions to NULL MODULE (step 325), the control module 165 starts the RESTART TIMER (step 330). The timer starts a count for a duration (e.g., 10 minutes).

If the control module 165 is in NULL MODE (step 320), then the control module 165 determines whether a restart of the engine 130 occurs because of a low battery voltage (step 335). If a restart of the engine 130 occurred not because of a low battery voltage but for some other reason (step 340), such as to enter the COOL MODE, then the control module 165 clears the RESET COUNTER and the RESET TIMER (step 345).

If the control module 165 did restart the engine 130 because of a low battery voltage (step 335), then the control module 165 determines whether the RESTART TIMER had expired (step 350), e.g., the RESTART TIMER is at zero. If so, then a sufficient time had elapsed since the previous restart due to low battery voltage and the control module 165 clears the RESTART COUNTER and the RESTART TIMER.

If the RESTART TIMER has not expired (step 350), then a restart due to a low battery voltage has occurred too soon from the previous operation of the engine 130. The control module 165 increments the RESTART COUNTER (step 355) and compares the RESTART COUNTER to a threshold (step 360). Depending on the result of the comparison (e.g., if the RESTART COUNTER equals the threshold, such as three), the control module triggers an alarm (step 365), which is communicated to an operator.

Accordingly, the invention provides a new and useful mobile environment-control unit, method of operating the mobile environment-control unit, and related controller for monitoring battery health status, predicting battery failure, and communicating the predicted battery failure. Various features and advantages of the invention are set forth in the following claims.

What is claimed is:

1. A mobile environment-controlled unit comprising:
a structure;
a compartment supported by the structure;
an environmental-control system in environmental communication with the compartment, the environmental-control system being configured to control an environmental parameter of the compartment, the environmental-control system including
an internal combustion engine, including a starter, powering the environmental-control system;
a battery powering the starter; and
a controller
monitoring an electrical parameter of the battery,
monitoring a non-battery parameter of the mobile environment-controlled unit,
controlling the engine in a cycle mode, including starting the engine based on the monitoring of the electrical parameter of the battery, stopping the engine based on the monitoring of the electrical parameter of the battery, starting the engine based on the monitoring of the non-battery parameter, and stopping the engine based on the monitoring of the non battery parameter, and
monitoring a battery health status, including counting a number of successive times the engine starts based on the monitoring of the electrical parameter of the battery without starting the engine based on the monitoring of the non-battery parameter, the counting being further based on monitoring a timer between either the stopping of the engine based on the monitoring of the electrical parameter of the battery or the stopping the engine based on the monitoring of the non battery parameter and the starting the engine based on the monitoring of the electrical parameter of the battery.

2. The mobile environment-controlled unit of claim 1 wherein the controller predicts a battery failure by comparing the count to a threshold.

3. The mobile environment-controlled unit of claim 2 wherein the controller communicates the predicted battery failure.

4. The mobile environment-controlled unit of claim 1 wherein the controller restarts the timer after each engine stop.

5. The mobile environment-controlled unit of claim 1 wherein the controller increments the counter when the engine starts based on the monitoring of the electrical parameter of the battery and when the timer is within a time period.

6. The mobile environment-controlled unit of claim 5 wherein the controller resets the counter when the engine starts based on the monitoring of the non-battery parameter.

7. The mobile environment-controlled unit of claim 5 wherein the controller resets the counter when the engine starts after the timer passes a time period.

8. The mobile environment-controlled unit of claim 5 wherein the controller resets the counter when the engine starts based on the monitoring of the non-battery parameter and wherein the controller resets the counter when the engine starts after the timer passes a time period.

9. The mobile environment-controlled unit of claim 1 wherein the environmental-control system is a refrigeration unit supported by the structure, wherein the environmental parameter is a temperature of the compartment, wherein the refrigeration unit further includes a temperature sensor in communication with the controller, and wherein the non-battery parameter is a temperature of the compartment.

10. The mobile environment-controlled unit of claim 8 wherein the refrigeration unit further includes a voltage sensor and the battery parameter includes a voltage of the battery.

11. The mobile environment-controlled unit of claim 9 wherein the refrigeration unit includes a control module including the controller.

12. A method of operating a mobile environment-controlled unit comprising
   a structure,
   a compartment supported by the structure, and
   an environmental-control system in environmental communication with the compartment, the environmental-control system including an internal combustion engine, having a starter, and a battery powering the starter, the method comprising:
   (a) monitoring an electrical parameter of the battery;
   (b) monitoring a non-battery parameter of the mobile environment-controlled unit,
   (c) starting the engine based on the monitoring the electrical parameter of the battery;
   (d) stopping the engine based on the monitoring the electrical parameter of the battery;
   (e) starting the engine based on the monitoring the non-battery parameter of the mobile environment-controlled unit;
   (f) stopping the engine based on the monitoring the non-battery parameter of the mobile environment-controlled unit;
   (g) repeatedly performing steps (c), (d), (e), and (f);
   (h) performing a repetitive timing function between the completion of either step (d) or step (f) and the starting of step (c);
   (h) incrementing a count based on a number of successive times the method repeats step (c) without sequentially performing step (e), the incrementing being further based on the repetitive timing function; and
   (i) predicting the battery failing based on the count.

13. The method of claim 12 wherein the non-battery parameter of the mobile environment-controlled unit includes a temperature of the compartment.

14. The method of claim 12 wherein the non-battery parameter of the mobile environment-controlled unit includes a temperature of the engine.

15. The method of claim 12 wherein the electrical parameter of the battery includes a voltage of the battery.

16. The method of claim 12 wherein the predicting the battery failure includes comparing the count to a threshold greater than two.

17. The method of claim 12 wherein step (h) includes incrementing the count when the method starts the engine based on the monitoring the electrical parameter of the battery and when the timing function is within a time period.

18. The method of claim 17, further comprising resetting the count when the engine starts based on the monitoring of the non-battery parameter.

19. The method of claim 17, further comprising resetting the count after the timing function passes a time period.

20. The method of claim 17, further comprising resetting the count when the engine starts based on the monitoring of the non-battery parameter and resetting the count after the timing function passes a time period.

* * * * *